United States Patent [19]

Bromell et al.

[11] 4,188,787

[45] Feb. 19, 1980

[54] HYDRAULIC CONTROL APPARATUS

[75] Inventors: Raymond J. Bromell, Dallas, Tex.; George Homanick, Lathrup Village, Mich.

[73] Assignee: National Advanced Drilling Machines, Inc., Houston, Tex.

[21] Appl. No.: 912,340

[22] Filed: Jun. 5, 1978

[51] Int. Cl.[2] .......................... F16H 39/46; F15B 1/02

[52] U.S. Cl. .......................................... 60/327; 60/416; 60/476; 60/478; 417/217

[58] Field of Search ................. 60/327, 408, 409, 414, 60/416, 476, 478, 479, 905; 91/390, 6; 417/217

[56] References Cited

U.S. PATENT DOCUMENTS

| | | | |
|---|---|---|---|
| 2,839,021 | 6/1958 | Patterson | 60/414 X |
| 3,163,005 | 12/1964 | Reed | 60/468 X |
| 3,530,669 | 9/1970 | Bromell et al. | 60/444 |
| 3,647,322 | 3/1972 | Molly | 417/217 |

*Primary Examiner*—Edgar W. Geoghegan
*Attorney, Agent, or Firm*—Jack A. Kanz

[57] ABSTRACT

Disclosed are methods and apparatus for controlling the flow of hydraulic fluid to and from a work cylinder. The disclosed system includes a reversible variable displacement pump interconnected between a work cylinder and a selector valve which may connect the pump with any of a plurality of fluid reservoirs. The fluid reservoirs contain hydraulic fluid at variable pressures so that the pressure at the work cylinder may be raised to pressures well above the pressure differential capacity of the pump at maximum flow rate by selectively increasing the pressure on the reservoir side of the pump. The system includes means for controlling the pressure at each port of the pump so that the pressue on the output port is always greater than the pressure on the input port regardless of the direction of flow through the pump and regardless of pressures at other points in the system. Relief circuits are provided to prevent system overloading, to prevent overloading of the pump and to protect against overloading the lift apparatus employing the hydraulic system of the invention.

28 Claims, 1 Drawing Figure

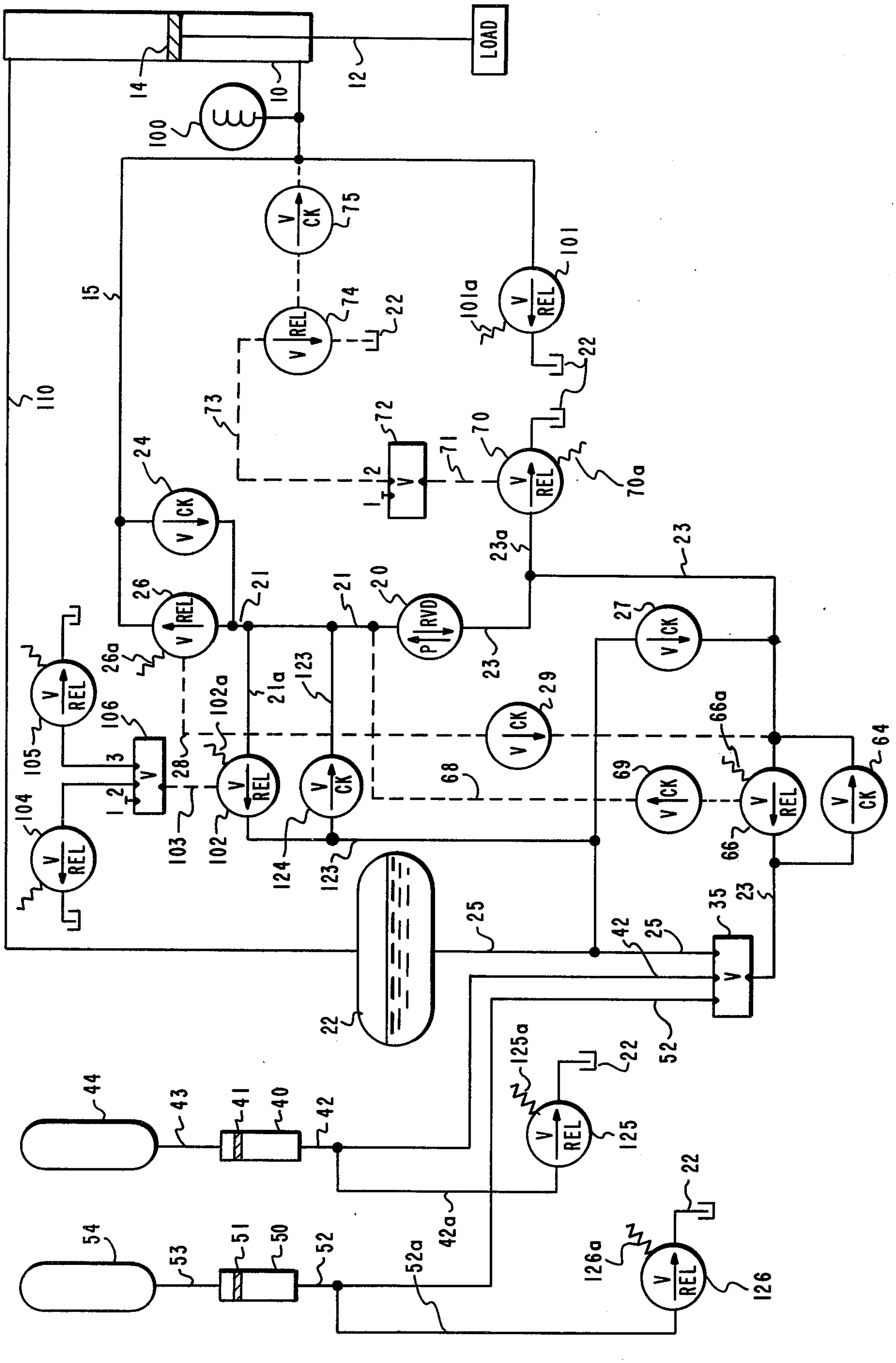
LOAD
V
CK
REL
RVD
P

HYDRAULIC CONTROL APPARATUS

This invention relates to hydraulic control systems. More particularly, it relates to methods and apparatus for controlling pressure changes across a reversible variable displacement hydraulic pump in response to working load pressure changes and pump input pressure changes and to methods and apparatus for supplying a controlled working load pressure to a work cylinder with a pump system requiring a minimum pump drive power.

In many hydraulic control operations it is necessary to control the flow of hydraulic fluid to and from a power operator, work cylinder or group of work cylinders (hereinafter referred to as a work cylinder). In addition to merely varying the rate of fluid flow, it may be neccessary to control the pressure differential across the pump when withdrawing fluid from the work cylinder to prevent the pressure in the work cylinder from over-driving the pump.

In various hydraulic systems employing a hydraulic cylinder to move a work load, the energy required to move the work load may vary considerably. This is particularly true where a work cylinder is used to lift a load from a resting position and re-position the load at another resting position. In this case the working pressure varies from the pressure required to support the load hook assembly (which may be minimal) to the pressure required to cause the work cylinder to lift the entire weight of the load and load hook assembly. When the load is re-positioned at rest, the pressure requirements are obviously changed. Where the maximum anticipated load is known, the pump and pump drive motor may be determined to provide sufficient flow and pressure to effect the desired lift rate. However, as the anticipated load increases, the horsepower requirements for the pump drive motor increase proportionately. It is desirable, of course, to minimize the pump drive power requirements, if possible, to minimize construction costs, operation costs, weight and physical size of the hydraulic system. This is particularly true where the anticipated maximum load may vary from less than one ton to more than 1,000 tons in normal operations, such as hydraulic lift cylinders in cranes, drill string suspension systems and the like.

U.S. Pat. No. 3,530,669 to Bromell et al. describes a system for controlling the flow of fluid to and from a hydraulic work cylinder which includes means for delivering fluid to and from the cylinder at variable rates. This system includes means for maintaining a pressure on the downstream port of the pump in excess of the upstream pressure when withdrawing fluid from the work cylinder. This system therefore prevents the pressure in the work cylinder from overdriving the pump. The back pressure may be automatically varied to maintain a desired pressure differential across the pump by causing the pump to pump over a relief valve controlled by the pressure on the upstream port. However, the power requirements for driving the pump are determined by the load on the work cylinder and the lift rate. Accordingly, when extremely heavy loads are lifted or lowered, the pump and drive motor must be of sufficient flow and power capacity to handle the maximum anticipated load.

In accordance with the present invention, a hydraulic system is provided which utilizes a series of accumulators, each containing fluid under incrementally increasing pressures, connectable to one port of a reversible variable displacement pump. A control system automatically switches the pump input port to an incrementally higher pressure input supply when the pressure differential across the pump reaches predetermined values as the load on the working cylinder increases, thereby maintaining a pre-determined maximum and minimum pressure differential across the pump regardless of the load on the working cylinder. The control system also automatically maintains the pressure on the output side of the pump in excess of the pressure on the input side of the pump regardless of the direction of flow through the pump. The control system thereby prevents the pressure in the work cylinder from over-driving the pump when fluid is withdrawn from the work cylinder with a load on the cylinder and also prevents the input pressure from over-driving the pump if the input pressure is greater than the pressure in the work cylinder.

Since the pressure differential across the pump at maximum flow never exceeds a pre-determined maximum regardless of the load on the work cylinder, the power requirements for driving the pump are limited to a pre-determined maximum pressure differential at a given flow rate. Accordingly, the power requirements for driving the pump are independent of the anticipated maximum load and, since the maximum pressure differential across the pump may be relatively small, the power requirements therefor are proportionately small. By reducing the power requirements for the pump and pump drive, vast savings in construction costs, maintenance and operation costs, and weight and size reductions are realized. Additionally, the control system permits the pump to re-pressurize the accumulators between use cycles at lower flow rates, thereby permitting one relatively low power and relatively inexpensive pump drive system to supply all the hydraulic power required to lift a disproportionally heavy load. These and other features and advantages of the invention will become more readily understood when taken in connection with the appended claims and attached drawing in which the sole FIGURE is a schematic illustration of the preferred embodiment of the hydraulic control system of the invention as employed in a positive heave compensated crane.

The principles of the invention may be applied in various hydraulic systems wherein a hydraulic power operator or work cylinder is used to perform useful work. The invention, however, finds particular utility in supplying the hydraulic lifting force for a heave compensated crane. Accordingly, for clarity of illustration the preferred embodiment of the invention is described herein adapted to control the flow of fluid to and from a work cylinder employed in a heave compensated crane. It should be understood, however, that the invention is not so limited.

Many operations involve the transfer of a load suspended on a tensioned cable from a first platform to a second platform. Typically, the first and second platforms are fixed relative to each other and such transfers may be accomplished with relative ease. However, in many situations, such as marine operations or the like, the first and second platforms may be vertically movable relative to each other and the relative vertical movement may not be predictable with exact certainty or uniformity. For example, in transferring a load from a pier to a floating vessel or vice versa, the floating vessel may move vertically in response to waves, tides, etc. while the pier remains fixed. Accordingly, relative vertical movement between the ship or barge deck and a crane mounted on the pier may cause difficulty in gently landing a load on the deck. The problem becomes even more acute in offshore operations where loads may be transferred between a floating barge and an offshore platform which is secured to the ocean floor. In such offshore operations, the wave action may be more severe and less predictable. Furthermore, offshore operations must often be carried out in rough weather wherein the heavy sea action makes such transfers extremely difficult. To further complicate the problem, many such load transfer operations involve the transfer of extremely heavy equipment, on the order of 1,000 tons, which equipment is very expensive and shock sensitive and may be seriously damaged unless landed on the receiving platform very carefully. Offloading from a ship or barge subject to vertical movement onto a fixed or floating platform on which the crane is mounted can also be extremely dangerous. If the hook is lowered to the deck of the barge for attaching to the load while the barge is at the bottom of a swell, the barge deck will rise as the swell rises and thus contact and raise the hook. The cable or sling lines suspended from the crane then becomes slack and may loop or become entangled with other cargo, personnel, or structure of the barge. When the barge sinks into the next valley between the swells, the hook is lowered with the barge deck and the cable again drawn taut, thus endangering other cargo, personnel and the like with which the slack cable or sling lines may have become entangled. To avoid this problem crane operators usually attempt to raise and lower the hook in synchronization with the pitching deck. However, attempts at manually coordinating hook movement with a pitching deck are notoriously ineffective.

Similar problems exist in attempting to transfer loads between two floating platforms such as the decks of two floating vessels, one of which carries the crane. In this case both platforms may move vertically with respect to each other and with respect to a fixed horizontal position, thus rendering the transfer between such independently moving platforms extremely difficult. Various other marine operations, such as laying pipe on the ocean floor from a floating vessel or landing submerged equipment on the ocean floor or submerged platforms from a floating vessel involve similar difficulties.

Prior attempts to overcome the difficulties involved rely mainly on means for maintaining a constant tension on the hoist load line. Such systems, however, suffer from inherent limitations. Conventional line tensioning apparatus operates on the line between the winch and the crane boom. Therefore, when multiple-reeved tackle is employed between the load hook and the crane boom the length of line between the crane boom sheave and the winch (known as the 'fast line') which must be adjusted to maintain a constant tension on the line at the load is a multiple of the vertical distance which must be compensated. Furthermore, such line tensioning offers no way to synchronize vertical movement of a load suspended from a crane on a fixed platform with vertical movement of a moving platform so that the load may be gently landed on a vertically moving platform. Accordingly, maintaining constant tension on a load line will not prevent the load from being smashed into a rapidly rising deck.

Hook-mounted relative motion compensation apparatus which adjusts the distance between the end of the crane boom and the load hook in response to vertical movement of the landing platform has been devised which overcomes some of the difficulties involved. However, such motion compensation apparatus, in order to be sturdy enough to support the weight of heavy loads, must itself be quite heavy. Furthermore, where such hook-mounted motion compensation apparatus is employed, the hydraulic cylinder assemblies as well as the motors and pumps necessary to drive the apparatus must also be carried by the hoist line. Since such motion compensation apparatus must be supported by the load line, the lifting capacity of the crane is reduced. Furthermore, such motion compensation apparatus must be suspended at the end of the load line near the hook so that the motion compensation apparatus will not substantially interfere with the height capacity of the crane. Large, bulky and heavy motion compensation apparatus suspended from the end of a load line may become difficult to maneuver in rough seas because of the action of the wind thereon. Furthermore, in situations where the crane is supported on a floating platform, oscillatory movement of the floating platform may be transferred to the suspended motion compensation apparatus and amplified, thus causing the motion compensation apparatus to sway and oscillate horizontally. Because of the mass of the motion compensation apparatus suspended on the end of the cable, such oscillatory motion can be dangerous and difficult to control in certain situations.

Vertical motion compensation apparatus may also be provided which is attached to the crane boom and operates only on the load line between the boom and the load hook. Since the motion compensation cylinder is secured to the boom, the pumps and motors necessary to activate the motion compensation apparatus may be carried on the crane platform and the high pressure fluid transferred to the motion compensation cylinder by a pressure line carried by the crane boom. Accordingly, the mass of the portion of the motion compensation apparatus carried by the boom is substantially reduced. Likewise, the physical size of the motion compensation apparatus carried by the boom is substantially reduced, thus the total lift capacity of the crane is not substantially impaired. Furthermore, since the motion compensation apparatus is attached to the boom itself, it is not subject to excessive wind loading problems or extreme oscillation caused by movement of the platform on which the crane is mounted.

The motion compensation cylinder may be attached between the end of the load line and the end of the crane boom. In this case, the load hook means is suspended from the cable looped between the crane boom and the motion compensation cylinder. The motion compensation apparatus must then support only one-half the weight of the load and must move the end of the cable vertically only twice the vertical distance to be compensated. Alternatively, the apparatus may include a sheaved travelling block (load sheave) carrying the load hook and a sheaved block carried or otherwise controlled by the motion compensation cylinder. In this arrangement the motion compensation apparatus must support more of the weight of the load (depending upon the number of reeves) but only need to move approximately the vertical distance to be compensated. Since the entire reeved cable and both sheave blocks are supported by a piston in the motion compensation cylinder supported by the boom, movement of the piston in proportion to relative vertical movement of the second platform eliminates undesired relative movement of the hook with respect to the landing platform. The load may thus be gently landed on a pitching platform by normal operation of the crane controls. Furthermore, in off-loading operations where a hook is lowered to be affixed to the cargo, a constant tension is maintained on the load cable by maintaining the load hook a minimum distance from the moving deck regardless of relative vertical movement of the two platforms.

In yet another alternative embodiment, the vertical motion compensation cylinder may be mounted parallel with the longitudinal axis of the boom and preferrably within the structure of the boom itself. In this embodiment a sheaved block carried on the end of a piston rod extending from the cylinder engages the load line between the load hook and the boom sheave and draws the load line over an idler sheave and into the boom structure to raise the load hook with respect to the boom.

In all the heave compensation systems described above, a hydraulic work cylinder is used to vary the vertical distance between the load hook and the boom sheave in direct proportion to relative vertical movement between the boom sheave and the landing platform, thereby cancelling the effect of relative vertical movement between the boom sheave and the landing platform. Sensors which determine relative vertical movement between the boom sheave and the landing platform generate appropriate signals to control the hydraulic power source which operates the work cylinder. For further detailed description of such sensor controlled heave compensated cranes reference may be had to co-pending application Ser. No. 815,530, abandoned, entitled "Hook-Mounted Vertical Motion Compensation Apparatus" filed July 14, 1977 and Application Ser. No. 838,085 entitled "Vertical Motion Compensated Crane Apparatus" filed Sept. 30, 1977, both of which are assigned to the same assignee as the present application.

The embodiment of the invention illustrated in the attached drawing is a hydraulic system for supplying hydraulic fluid to the work cylinder in such heave compensated cranes. Accordingly, since the crane and the manner in which the heave compensation system is adapted to the crane form no part of the present invention, the structure of the crane is not shown in detail. It will be understood, however, that the work cylinder 10 illustrated in the drawing may be affixed to the crane boom either vertically as shown or in other arrangements where the piston rod 12 is either connected directly to the load hook or operates on the hoist line between the load hook and the boom sheave to vary the vertical separation between the boom sheave and the hook in response to relative vertical movement of the boom sheave and the landing platform. Various such arrangements are disclosed in the applications for patent noted hereinabove. Accordingly, for purposes of this invention, the piston rod 12 is simply shown as lifting a load. The manner in which the load is actually raised or lowered by the piston forms no part of this invention.

In the apparatus illustrated, a reversible variable displacement pump 20 delivers hydraulic fluid to and withdraws fluid from work cylinder 10 by way of high pressure line 21 and cylinder line 15 as required to raise and lower piston 14 in cylinder 10. In raising the load, the pump initially withdraws fluid from supply reservoir 22 through supply line 23. In lowering the load, the operation is reversed. A check valve 24 permitting fluid flow from the cylinder 10 to the pump and a pilot operated relief valve 26 are connected in parallel between the high pressure line 21 and the cylinder line 15.

The purpose of pilot operated relief valve 26 is to insure that the pressure between the cylinder port of the pump 20 and valve 26 is always greater than the pressure in supply line 23 at the reservoir port when fluid is being pumped toward the cylinder 10. Relief valve 26 opens to permit fluid flow from high pressure line 21 to cylinder line 15 only when the pressure in the high pressure line 21 exceeds a certain control pressure. To effect such pressure controlled operation of valve 26 a control pressure line 28 (shown in dashed line) is connected between the pilot port of valve 26 and the supply line 23. The control pressure line 28 is provided with a check valve 29 which permits fluid flow only from the pilot port of valve 26 to supply line 23. If the pressure in supply line 23 is greater than the pressure in line 21, valve 26 does not open. Pump 20 would then be pumping against a closed valve 26 and the pressure in high pressure line 21 rapidly increases. When the pressure in line 21 exceeds the pressure in line 23, the control pressure line 28 is vented to the pressure in line 23 through check valve 29, thus the relief valve 26 opens. Control spring 26*a* is set to open at maximum system pressure, thus does not affect the normal operation of valve 26. Thus the control pressure for valve 26 is the pressure in the supply line 23 plus the check valve bias spring.

At the beginning of each lifting cycle supply line 23 will be connected to a supply reservoir 22 through supply control valve 35 and reservoir line 25. Supply line 23 is also connected to reservoir line 25 through check valve 27 which permits fluid to flow from reservoir 22 to line 23 regardless of the position of supply control valve 35 if the pressure in line 25 exceeds the pressure in supply line 23.

The reservoir 22 contains fluid maintained at a relatively constant pressure of about 150 psi as will be described hereinafter. Therefore, a pressure of 150 psi initially appears at the supply port of pump 20. As is well known in the art, an input pressure of about 150 psi is required for normal operation of most reversible variable displacement hydraulic pumps which may be used in the system described. Likewise, the 150 psi supply line pressure appears at check valve 29. When the pressure in high pressure line 21 exceeds the pressure in cylinder line 15 by the amount sufficient to overcome the control pressure (pressure in line 23 plus the bias spring in check valve 29), fluid flows through the pilot operated relief valve 26. When the pressure in line 21 exceeds the pressure in line 23, the only pressure drop occuring across valve 26 is the bias spring pressure of the check valve 29. Since the initial pressure in line 23 is only 150 psi, the only pressure drop occuring across valve 26 is the pressure represented by the spring in check valve 29. Accordingly, using only the reservoir pressure of 150 psi on the supply line, the pump 20 operates in normal fashion to raise the pressure in cylinder 10 until the load is raised or until the pressure differential across the pump 20 reaches the maximum pressure differential achievable across pump 20 at full yoke.

Since one of the major objectives of the invention is to provide heavy lifting capacity with low power requirements for the pump, the invention will be described hereinafter with reference to a pump having a pump pressure differential capacity of only 1200 psi at full yoke. Accordingly, the system described hereinabove is sufficient to operate cylinder 10 to raise a load only if the load can be lifted with a cylinder pressure of 1300 psi. As explained above, the pressure in cylinder 10 will be the pressure in the supply line 23 plus the pressure differential of the pump 20 less the pressure drop across valve 26. Therefore, the maximum pressure appearing in cylinder 10, assuming a 150 psi supply line pressure, a 1200 psi pressure increase across the pump at maximum capacity, and a 50 psi drop across valve 26, is a maximum of 1300 psi at the cylinder. Therefore, to increase the pressure in the cylinder without increasing the pressure differential capacity of the pump at full yoke, the pressure in the supply 23 line must be increased.

In accordance with the invention, one or more accumulators are provided to supply fluid to the supply line 23 at increased pressures as needed. The accumulator system comprises at least one tank of fluid maintained under a pressure greater than the pressure in supply reservoir 22 selectively connectable to the supply line 23. In the embodiment illustrated, two accumulator tanks 40 and 50 are shown. Accumulator tank 40 comprises a cylindrical tank with a free piston 41 dividing the tank into two compartments of variable volume. The lower compartment is filled with hydraulic fluid to raise the piston 41 to near the top of the tank. The lower compartment is connected to an outlet line 42. The upper compartment is connected to an inlet line 43 which communicates with a tank 44 of pressurized compressible gas such as air, nitrogen or the like. The compressed gas tank 44 is pressurized to the desired initial boost pressure and the volume thereof adapted to provide a pre-determined minimum boost pressure when expanded to deplete all the fluid from tank 40. For explanatory purposes, assume tank 44 is pressurized to 1800 psi and sized to produce a minimum pressure of 1200 psi when the fluid in tank 40 is depleted. Thus the first accumulator represented by tanks 40 and 44 may supply fluid at an initial pressure of 1800 psi which reduces to 1200 psi as the fluid in tank 40 is depleted.

The second accumulator is similar to the first accumulator but charged to a higher pressure. For purposes of illustration, assume that the second accumulator is charged to supply fluid at an initial pressure of 2400 psi which reduces to 1800 psi when the fluid in tank 50 is depleted.

When the pressure in cylinder 10 reaches the maximum achievable at maximum flow with the initial supply line pressure (or a predetermined lower pressure at which boost pressure is desired), means is provided to connect the first accumulator 40 to the supply line 23. The switching means illustrated comprises a pressure transducer 100 responsive to the pressure in cylinder line 15 which generates a signal to actuate supply control valve means 35. In the example given, when the pressure in line 15 reaches 1300 psi, transducer 100 generates a signal which causes supply control valve means 35 to switch supply line 23 from reservoir line 25 to accumulator outlet line 42. Thus, the maximum pressure of 1800 psi available in line 42 appears in the supply line 23.

It will be observed that when the pressure in supply line 23 is increased from 150 psi to 1800 psi the pressure in high pressure line 21 on the cylinder side of pump 20 is only 1350 psi, thus the boost pressure will overdrive the pump unless means is provided to maintain a positive pressure differential thereacross. It will be observed, however, that the pressure in supply line 23 also appears at check valve 29 in the pressure control line 28 controlling pilot operated relief valve 26. Accordingly, the control pressure for valve 26 is simultaneously raised from 150 psi to 1800 psi plus the bias pressure of the spring in valve 29. If the load to be lifted requires a cylinder pressure in excess of 1300 psi, the pilot operated relief valve 26 maintains a pressure drop thereacross equal to the difference in the pressure in line 23 and line 15. Therefore, when the 1800 psi pressure appears in line 23 and the pressure in line 15 is only 1300 psi, relief valve 26 maintains a pressure drop thereacross of 500 psi. As the pressure in line 15 increases, the difference decreases and the pressure drop automatically decreases until the pressure in line 15 is equal to 50 psi less than the pressure in line 21. Since the pressure on the reservoir side of pump 20 (at the time that valve 35 shifts from reservoir 22 to accumulator 40) is greater than the pressure in line 15, the load on the pump is dramatically reduced. However, valve 26 prevents the fluid in line 23 from over-driving the pump by maintaining the pressure in line 21 at least 50 psi greater than the pressure in line 23. Thus the pressure in line 21 is immediately increased to 1850 psi and the pump 20 continues to pump against a pressure on the cylinder side which is greater than the pressure on the reservoir side.

It will be observed that as pump 20 continues to withdraw fluid from accumulator 40 the pressure in accumulator 40 reduces. With a maximum pressure differential across the pump at full yoke of 1200 psi, the maximum pressure appearing in line 21 with the pump withdrawing fluid from accumulator 40 will be 3000 psi under the example conditions given. Since there is a 50 psi drop across relief valve 26, the maximum pressure appearing in cylinder line 15 with the pump operating at full yoke will be 2950 psi. However, as fluid is withdrawn from accumulator 40, the pressure therein is decreased to 1200 psi. Therefore, the maximum pressure appearing in cylinder line 15 with the pump operating at full yoke and the supply of fluid in accumulator 40 depleted will be 2350 psi.

When the maximum pressure achievable using the accumulator 40 as a source is reached in line 15 (or at a predetermined lower pressure in which additional boost pressure is desired), means is provided to connect the second accumulator 50 to the supply line 23. The switching means illustrated comprises the pressure transducer 100 which is responsive to the pressure in cylinder line 15 and generates a signal to actuate supply control valve means 35. In the example given, when the pressure in line 15 reaches 2350 psi, transducer 100 generates a signal which causes supply control valve means 35 to switch line 23 from line 42 to second accumulator outlet line 52. Thus, the maximum pressure of 2400 psi available in line 52 appears in the supply line 23. As noted above, the control pressure for valve 26 is simultaneously raised to 2400 psi plus the check valve spring pressure and operates to maintain the required pressure drop across valve 26 so that the pump 20 continues to pump against a pressure on the cylinder side which is greater than the pressure on the supply side.

From the foregoing, it will be observed that through the use of additional pressurized accumulators containing hydraulic fluid at incremently increased initial pressures, the pressure available in cylinder line 15 may be increased as desired employing a single pump of limited pressure differential capability at full yoke. Accordingly, utilizing the principles described hereinabove, a hydraulic lift system may be designed using a single pump of limited pressure differential capacity at maximum yoke which rapidly supplies the required fluid flow and required pressures to lift any desired load. It will further be observed that by using the pressure at the reservoir port of the pump to control relief valve 26, the supply line 23 may be switched between the reservoir and incrementally increased pressure accumulators as required to provide the desired input pressure to the pump 20 yet prevent the input pressure from over-driving the pump while allowing the pump to operate at full yoke, thus providing smooth and continuously increasing supply pressures to the work cylinder.

While accumulators 40 and 50 have been described as tanks containing a fixed volume of fluid under an initial pressure which is reduced as the fluid is withdrawn, it will be appreciated that compressed gas cylinders 44 and 54 may be maintained at a constant pressure by conventional means such as auxiliary gas compressors (not shown). In this case the pressure in the accumulators may be maintained relatively constant, if desired. However, by using the acuumulator system illustrated in the drawing, the pump may be used to recharge the accumulators as will be described hereinafter. Accordingly, additional gas pressurization will only be required to restore pressure loss resulting from normal leakage.

In the particular application described, wherein the work cylinder is used in a heave compensator system to maintain a load hook fixed in space relative to a vertically moving platform, it is essential that the hydraulic system be capable of uniformly and rapidly supplying fluid to the work cylinder at the required pressures during the lifting cycle. Likewise, it is essential that the hydraulic system be capable of withdrawing fluid from the cylinder equally rapidly and uniformly to lower the hook when relative vertical movement between the landing platform and the boom sheave is detected.

When the pump is operated to withdraw fluid from the work cylinder 10 the full pressure in cylinder line 15 is applied on the cylinder port of the pump 20 by way of check valve 24. Thus means must be provided to maintain the hydraulic fluid pressure in the supply port greater than the pressure in high pressure line 21 to prevent the fluid in line 21 from over-driving the pump. For this purpose, a pilot operated relief valve 66 and check valve 64 are connected in parallel in line 23 between the supply port of pump 20 and supply control valve means 35. Check valve 64 permits fluid flow only from the supply control valve to the pump 20. Thus, fluid flow is unrestricted through the supply line 23 when the pump is operated in the lifting cycle. However, when the pump is reversed to withdraw fluid from the cylinder, the check valve 64 closes and fluid must be pumped over relief valve 66. Pilot operated relief valve 66 is controlled by a check valve 69 and the pressure in line 21. High pressure line 21 is connected to the pilot control port of relief valve 66 by way of control pressure line 68. The check valve 69 is interposed in control pressure line 68 so that the pressure in line 21 always appears at check valve 69. Relief valve 66 operates in the same manner as described hereinabove with respect to valve 26 to maintain the pressure on the output side (supply port) greater than the pressure on the input side (cylinder port) of the pump when the pump is reversed to withdraw fluid from the cylinder 10.

The apparatus described above thus comprises a reversible variable displacement pump 20 with a supply port and a cylinder port. The cylinder port is connected to the cylinder 10 through conduit means which includes a check valve 24 in parallel with a pilot operated relief valve 26 which is controlled by the pressure at the supply port of the pump. Similarly, the supply port is connectable to a reservoir through conduit means which includes a check valve 64 and a pilot operated relief valve 66 which is controlled by the pressure at the cylinder port. It will be observed, therefore, that when the pump is operated to withdraw fluid from the cylinder the pressure in line 23 must exceed the control pressure in line 68. Furthermore, if the pressure in line 21 is greater than the pressure in line 23, a pressure drop is maintained across relief valve 66 in an amount equal to the control pressure in line 68 plus the difference in the pressure in line 21 and the pressure in line 23 at the supply control valve 35. Accordingly, the pressure on the output side of the pump, regardless of whether the pump is supplying fluid to the cylinder 10 or withdrawing fluid from the cylinder 10, is always greater than the pressure on the input side of the pump.

It will be observed that when the system described is used in a heave compensated crane, the piston rod 12 may be supporting a load being lowered onto a landing platform which moves vertically with respect to the boom sheave of the crane. Accordingly, the system supplying hydraulic fluid to cylinder 10 must supply fluid to and withdraw fluid from cylinder 10 in response to signals which indicate relative vertical movement of the landing platform. When the vertical separation between the boom sheave and the landing platform increases, fluid is withdrawn from cylinder 10 to maintain the load hook at a constant vertical separation from the downwardly moving landing platform. Conversely, when the vertical separation between the boom sheave and the landing platform decreases, hydraulic fluid is added to the cylinder 10 to raise the load hook with respect to the boom sheave. It will be observed that under these conditions, virtually the entire load is supported by piston 14.

The pressure in cylinder 10 is, of course, the result of the load supported. To counterbalance the load pressure, the compensation system must supply the same pressure. The balance pressure is, therefore, the sum of the pressure differential supplied by the pump and supply pressure from the reservoir 22 or one of the accumulators. It will be observed, however, that as the system adds and withdraws fluid from the cylinder 10, fluid is pumped across pump 20 in the required direction as determined by the compensation sensor system controlling the pump.

Withdrawal of fluid from the hydraulic cylinder may occur while line 23 is connected to the output line 52 of accumulator 50, to output line 42 of accumulator 40, or to the reservoir 22. The pressure differential required to pump fluid into the accumulator may never exceed the pressure differential capacity of the pump at full yoke since valve 35 is controlled by the pressure in the cylinder 10. Pressure relief valve 66, however, which is controlled by the pressure in high pressure line 21, always maintains the pressure on the reservoir side of the pump 20 greater than the pressure in high pressure line 21 when the pump is operating to withdraw fluid from the cylinder 10. Accordingly, pump 20 may be operated in either direction to supply hydraulic fluid to or withdraw hydraulic fluid from cylinder 10 at maximum flow capacity. However, the fluid pressure on the input port can never exceed the fluid pressure on the output port of the pump regardless of the direction in which the pump is operating or the load supported by the cylinder.

Upon landing a load upon the landing platform it will be apparent that the pressure in cylinder 10 may go from an extremely high pressure to an extremely low pressure almost instantaneously. If this occurs while the pump is operating to withdraw fluid from cylinder 10 to maintain the load in a fixed spatial relationship with the landing platform, the pressure on the output side of the pump (in this case line 23) may substantially exceed the pressure differential capacity of the pump at full yoke. Accordingly, the ability of the pump to withdraw fluid from the cylinder 10 as rapidly as desired to compensate for relative vertical movement of the landing platform and the boom sheave may be impaired until such time as the valve 35 may be shifted to disconnect line 23 from the high pressure line 52 or 42 and reconnect line 23 to low pressure reservoir 22. It will be understood that although supply control valve 35 is depicted in the drawing a simple selector valve, in actual practice the function of selector valve 35 may be accomplished by a more complicated valve system required to handle the flow rates and pressures involved. Accordingly, using presently available valve systems, switching line 23 between lines 42, 52 and 25 may not in fact be accomplished instantaneously. Therefore, because of the time lags in shifting valve 35, the pressure in line 23 may momentarily remain at a greater pressure than the maximum yoke pressure differential of the pump 20. If this occurs, pump 20 would be unable to withdraw fluid from the cylinder 10 as rapidly as desired. To protect against this possibility, a bypass relief system comprising pilot operated relief valve 70 and line 23a is interconnected between reservoir 22 and supply line 23. The operation of relief valve 70 is controlled either by a preset pressure represented by spring 70a or the pressure appearing in control line 71, whichever is lower. Control line 71 is selectively alternatively switched between ports 1 and 2 of control valve 72. When the control line 71 is connected to port 1 of control valve 72, control line 71 is completely blocked. Therefore, the control pressure of line 71 is effectively infinity ane relief valve 70 cannot open until the pressure in line 23a exceeds the pressure setting of spring 70a. Spring 70a is normally set for the maximum pressure permissible in supply line 23 and thus, in this arrangement, relief valve 70 acts as an overload relief valve. However, when control pressure line 71 is connected to port 2 of valve 72, control line 71 is connected to the cylinder 10 by way of control pressure line 73, relief valve 74 and check valve 75. Accordingly, the pressure in cylinder 10 becomes the control pressure at the pilot port of relief valve 70. In this arrangement relief valve 70 may open to allow fluid flow from line 23 directly into reservoir 22 whenever the pressure in line 23 exceeds the pressure in cylinder 10.

For normal operation, valve 72 may be slaved to the servo mechanism controlling the yoke on pump 20. In this arrangement line 71 is automatically switched to port 1 whenever the pump is operated to pump fluid into high pressure line 21. Likewise, whenever the pump is reversed, valve 72 is automatically reversed so that the pressure controlling relief valve 70 is the pressure appearing in cylinder 10. Valve 72 only switches a very low flow rate bleed line, thus valve 72 may operate effectively instantaneously. Since relief valve 70 opens only when the pressure in line 23 exceeds the lowest control pressure, if the pump is reversed with a high load on the cylinder 10, pressure relief valve 70 does not open. However, should the pressure in cylinder 10 suddenly drop (such as would occur when the load is landed on the landing platform) while the pump 20 is withdrawing fluid from cylinder 10, the pressure differential between lines 21 and 23 may be greater than the pressure differential capacity of the pump at full yoke, thus impairing the pump's ability to withdraw fluid from the cylinder at the maximum required rate. However, if the pressure in the cylinder 10 suddenly drops below the pressure in line 23, the control pressure appearing in line 71 likewise drops and relief valve 70 opens immediately. Accordingly, the pressure in line 23 may be vented directly to the low pressure reservoir 22 until valve 35 can be switched to connect line 23 directly to line 25.

Valve 72 may be manually, electronically, or hydraulically operated as desired. If, however, the operation of valve 72 is automatically slaved to the direction of flow through the pump 20, means must be provided to override the control of valve 72 and maintain line 71 connected to port 1 when the pump 20 is used to recharge the accumulators as described hereinafter.

Various other protection circuits to protect the pump and crane against overload conditions are illustrated in the drawing. For example, where a crane on a fixed or floating platform is used to transfer loads to or from a floating platform, such as a barge, it is possible to accidentally engage the load hook with the cargo platform itself rather than the intended cargo. Furthermore, the cargo is frequently welded or otherwise attached to the deck of the barge during transit and the attachments may not be completely removed before the load hook is attached to the cargo. When the crane is activated to lift an attached cargo, or if the load hook has accidentally engaged the barge itself, the crane will be subjected to the entire weight of the barge. Obviously, the weight of the barge may be well in excess of the lift capacity of the crane and it is not unusual to cause severe damage to the crane when the load hook is accidentally hooked to the barge. To prevent damage to the crane in such situations, the system of the invention provides a relief system to permit lowering of the hook with respect to the crane when the load on the hook exceeds the capacity of the crane.

To protect the pump and the crane structure against such overload conditions, high pressure line 21 is vented to reservoir 22 through line 21a and relief valve 102 whenever relief valve 102 is opened. Valve 102 is a pilot operated relief valve which is controlled by the control pressure appearing in line 103 or the preset pressure setting of spring 102a, whichever is lower. Control line 103 may be selectively switched by selector valve 106 between additional relief valves 104 and 105 by way of ports 2 and 3 or completely blocked by connecting line 103 to port 1. Valve 106 is slaved to valve 35 so that when line 23 is connected to line 25 through valve 35, control line 103 is connected to valve 104. When line 23 is connected to line 42 through valve 35, control line 103 is connected to valve 105. When line 23 is connected to line 52 through valve 35, control line 103 is connected to closed port 1 of valve 106.

Relief valve 104 is set to open when the pressure in line 103 exceeds a pre-determined value, such as the maximum pressure differential of the pump at maximum flow plus pressure in the supply reservoir 22. Since valves 106 and 35 are operated together, whenever the pump is withdrawing fluid from reservoir 22 relief valve 104 determines the control pressure. Therefore, if the load on the piston 14 exceeds the maximum pressure available (plus a nominal overload pressure), an overload condition is indicated and high pressure line 21 is vented to reservoir 22, thus permitting the piston to be lowered with respect to the cylinder while maintaining no more than the maximum system pressure (plus the nominal overload pressure) on the load hook. The pump and the crane structures are thus protected against an overload condition.

In similar fashion, relief valve 105 is set to open when the pressure in control line 103 exceeds a predetermined value, such as the maximum pressure differential of the pump at maximum flow plus the maximum pressure in accumulator tank 40. Since valves 106 and 35 are operated together, whenever the pump is withdrawing fluid from accumulator tank 40, relief valve 105 determines the control pressure. Therefore, if the load on the piston 14 exceeds the maximum system pressure available (plus a nominal overload pressure), an overload condition is indicated and high pressure line 21 is vented to reservoir 22. Likewise, the control spring 102*a* on valve 102 is set at the maximum pressure ever allowable in the system. Accordingly, since line 103 is blocked at port 1 of valve 106, the pressure in line 103 is effectively infinity and the preset pressure of spring 102*a* controls the opening of relief valve 102. Spring 102*a*, however, does not permit relief valve 102 to open until the pressure in high pressure line 21 is greater than the maximum permissible pressure ever to be allowed in the cylinder 10.

If desired, an additional overload circuit may be provided which reacts more rapidly to sudden pressure changes in the cylinder 10 as would occur when a heavy load is suddenly applied to the load hook. For example, the load hook may be engaged with a load which is less than the maximum lift capacity of the crane if slowly lifted; but which would cause an overload condition on the crane if the crane operator attempted to suddenly lift the load from a resting position. To protect the crane apparatus and the hydraulic control system from such sudden pressure spikes, cylinder 10 is vented directly to supply reservoir 22 through pressure relief valve 101. Control spring 101a is set at the maximum allowable pressure in cylinder 10. Accordingly, if a sudden pressure is applied to cylinder 10 which is in excess of the allowable system pressure, relief valve 101 temporarily opens to vent the cylinder directly to the supply reservoir 22 until the pressure in the cylinder 10 is reduced to the maximum allowable pressure. In this manner, relief valve 101 eliminates sudden pressure surges or spikes which are in excess of the maximum system pressure.

From the foregoing it will be apparent that the system of the invention may be used to supply fluid to and remove fluid from a work cylinder lifting a load and also maintain the load in spaced relation with a landing platform vertically moving with respect to the cylinder. It should be noted, however, that fluid vented from the high pressure line 21 and cylinder 10 during overload conditions, as well as fluid from the control pressure bleed lines, is returned to the reservoir 22 regardless of the position of valve 35. Accordingly, the fluid contained in one or more of the accumulators may be depleted and effectively transferred to the low pressure reservoir 22 during an extended use cycle. For design considerations, low pressure reservoir 22 should have a fluid capacity sufficient to contain all the fluid originally contained in accumulators 40 and 50 as well as the fluid originally contained in reservoir 22.

Since the fluid originally contained in accumulators 40 and 50 may be transferred to the low pressure reservoir 22 during operation of the system to transfer a load (or may be contained in the work cylinder at the end of a use cycle), it is necessary that the accumulators 40 and 50 be recharged prior to a subsequent use cycle. If desired, an auxiliary pump system (not shown) may be used to transfer fluid from the reservoir 22 to accumulators 40 and 50. However, since the pump 20 and power drive system therefor are already available in the system, the pump 20 may be used to recharge the accumulators. Furthermore, use of the pump 20 for recharging the accumulators eliminates the need for an auxillarly pump and pump power drive supply therefor, and more effectively uses pump 20 since pump 20 would otherwise be inoperative during the recharge operation.

For transferring fluid from reservoir 22 to the accumulators, a supply line 123 is connected between reservoir line 25 and high pressure line 21. A check valve 124 is positioned in supply line 123 to permit fluid to flow from the reservoir 22 to line 21 but prevent flow from line 21 into the reservoir 22. Accordingly, pump 20 may be operated to withdraw fluid from reservoir 22 through lines 123 and 21 and deliver the fluid into supply line 23. As discussed above, fluid flowing from pump 20 through line 23 must be pumped over relief valve 66 to selector valve 35.

For recharging the accumulators, selector valve 35 is positioned to interconnect line 23 with line 42 so that fluid pumped from reservoir 22 is returned to accumulator 40. It should be noted that when fully charged accumulator 40 is (under the example conditions previously stated) 1800 psi. Since the maximum pressure differential of the pump 20 at full yoke is only 1200 psi, and since a 50 psi pressure drop occurs across relief valve 66, the pump 20 will not be able to fully recharge accumulator 40 to its maximum pressure at full yoke. However, by reducing the flow rate through pump 20 the pressure differential thereacross may be increased. Accordingly, as the pressure in the accumulator approaches the maximum pressure differential of the pump at maximum yoke, the pump is yoked to lower flow rates and may be used to repressurize the accumulator 40 to maximum pressure at a reduced flow rate. To protect the pump against over-load conditions (as would occur when accumulator 40 is fully recharged) line 42 is vented to low pressure reservoir 22 through line 42*a* and relief valve 125. Accordingly, the spring 125*a* on relief valve 125 is set to permit relief valve 125 to open when the maximum pressure required for accumulator 40 is obtained.

Accumulator 50 may be recharged in the same manner by shifting valve 35 to connect line 23 with line 52. Similarly, when the pressure in accumulator 50 reaches the maximum required, line 52 is vented to low pressure reservoir 22 via line 52*a* and relief valve 126. The preset pressure of the spring 126*a* controlling relief valve 126 is set at the maximum pressure required in accumulator tank 50.

It will be observed that when recharging accumulator 50, a pressure of 2400 psi must be obtained. As noted above, however, this pressure may be obtained by yoking the pump to lower the flow rate and thus permit the pump to gradually increase the pressure in accumulator 52 to the required value. Although the flow rate will be substantially reduced during the recharging operation, the recharging is performed between use cycles of the heave compensator system so that use of the crane in which the system is employed is not impaired. In most circumstances complete recharging can be accomplished during the time between removal of a cargo from the load hook and repositioning of the load hook above the next cargo package to be transported.

As indicated above, most reversible variable displacement hydraulic pumps require a certain input pressure on the input port. Accordingly, the space above the fluid in reservoir 22 is initially pressurized with a compressed gas such as nitrogen, helium or air, depending on the hydraulic fluid used. Since the volume of hydraulic fluid in the reservoir varies, the pressure in the reservoir may vary. As illustrated in the drawing, the space above the hydraulic fluid in reservoir 22 is in communication with the space above the piston 14 in cylinder 10 by way of conduit 110. Thus when hydraulic fluid is withdrawn from reservoir 22 and pumped into the cylinder 10, the increase in gas volume in the reservoir 22 will be substantially identical to the decrease in volume of space above the piston. Accordingly, the piston 14 effectively acts to maintain a relatively constant pressure in the reservoir 22.

As noted above, fluid may be withdrawn from the accumulators 40 and 50 during cycled operation of the piston at high loads and returned to reservoir 22 through bleed lines, etc. Accordingly, the gas space above the fluid in reservoir 22 will be decreased without a corresponding increase in space in cylinder 10, thus causing an increase in gas pressure in reservoir 22. The reservoir 22 may be designed with sufficient volume so that the increase in gas pressure is relatively small. Alternatively, the reservoir 22 may be provided with a pressure relief valve and means for replenishing the lost gas when required.

It will be readily apparent to those skilled in the art that a reversible variable displacement pump, such as pump 20, may be powered by any suitable drive means, and that the direction of flow and flow rate generated by the pump may be controlled by conventional servo mechanisms. Although not explicitly illustrated in the drawing, it will also be recognized that various sensing means may be coupled with the pump control servo mechanism to cause the pump to operate as required for any desired application. For example, to cause the control system of the invention to act as a heave compensator, the sensor means must determine relative vertical movement between the boom sheave and the landing platform and translate such information into signals for appropriately controlling the pump. Various sensors and translating mechanisms are available and may employ laser or radar ranging devices, accelerometers, or other electronic, mechanical or optical systems.

In the specific embodiment of the invention described, a transducer 100 is illustrated as an exemplary means for generating a signal for controlling the supply control valve 35. Conventional electrical systems, such as leads, relays, etc. for translating the transducer signal to cause operation of the valve 35 are deleted for clarity of illustration. It will be readily appreciated that other means, such as hydraulic, pneumatic or electronic systems may be employed to accomplish the desired switching of the control valves. Accordingly, while the invention has been described with particular reference to a motion compensated crane employing electrical controls for the valves, it will be readily apparent to those skilled in the art that the principles of the invention may be used in other apparatus and employing other valve control systems.

It is to be understood that although the invention has been described with particular reference to a specific embodiment thereof, the form of the invention shown and described in detail is to be taken as the preferred embodiment of same, and that various changes and modifications may be resorted to without departing from the spirit and scope of the invention as defined by the appended claims.

What is claimed:

1. Apparatus for controlling the flow of fluid to and from a work cylinder comprising:

(a) reversible pump means for selectively alternatively delivering fluid between a first port and a second port at selectively variable rates, (b) first conduit means connected between said first port of said pump means and said work cylinder, (c) second conduit means connectable between a fluid reservoir and the second port of said pump means, (d) first control means in said first conduit means permitting unrestricted fluid flow from said work cylinder to said first port but maintaining the pressure in said first conduit means between said first port and said first control means greater than the pressure at said second port when said pump means is operated to deliver fluid from said second port to said first port, and (e) second control means in said second conduit means permitting unrestricted fluid flow from said fluid reservoir to said second port but maintaining the pressure in said second conduit means between said second port and said second control means greater than the pressure at said first port when said pump means is operated to deliver fluid from said first port to said second port.

2. Apparatus as defined in claim 1 wherein said first control means comprises a check valve and a pilot operated relief valve responsive to the pressure at said second port arranged in parallel in said first conduit means, whereby the pressure at said first port is maintained at a greater value than the pressure at said second port when the pump means is operated to deliver fluid from said second port to said first port.

3. Apparatus as defined in claim 1 wherein said second control means comprises a check valve and a pilot operated relief valve responsive to the pressure at said first port arranged in parallel in said second conduit means, whereby the pressure at said second port is maintained at a greater value than the pressure at said first port when the pump means is operated to deliver fluid from said first port to said second port.

4. Apparatus as defined in claim 1 including a plurality of fluid reservoirs selectively connectable to said second conduit means, each of said fluid reservoirs containing fluid under pressure.

5. Apparatus as defined in claim 4 wherein said plurality of fluid reservoirs comprises at least a first reservoir and a second reservoir and the pressure in said second reservoir is substantially greater than the pressure in said first reservoir.

6. Apparatus as defined in claim 5 including selector valve means for selectively alternatively interconnecting said reservoirs with said second conduit means.

7. Apparatus as defined in claim 6 including means for determining the fluid pressure in said work cylinder and generating a signal at pre-determined pressures, and means responsive to said signal controlling said selector valve means, thereby to selectively interconnect said first reservoir or said second reservoir with said second conduit means at pre-determined pressures in said work cylinder.

8. Apparatus as defined in claim 6 including means responsive to the fluid pressure in said work cylinder for selectively interconnecting any of said plurality of reservoirs with said second conduit means.

9. Apparatus as defined in claim 1 including means for limiting the maximum pressure maintainable in said work cylinder.

10. Apparatus as defined in claim 9 wherein said means for limiting the maximum pressure maintainable in said work cylinder comprises pressure relief valve means permitting fluid to escape from said cylinder when the fluid pressure in said cylinder exceeds a pre-determined value.

11. Hydraulic relief circuit means for limiting the pressure on the supply port side of a reversible variable displacement pump adapted for selectively alternatively delivering fluid between a supply port and cylinder port comprising;

(a) conduit means connected between said supply port and a fluid reservoir, and (b) valve means controlling fluid flow through said conduit means, said valve means adapted to permit fluid flow through said conduit means only when the pressure at said supply port exceeds the lower of two pre-determined pressures.

12. Hydraulic relief circuit means as defined in claim 11 wherein said valve means comprises a pilot operated relief valve which opens to permit fluid flow therethrough only when the pressure at said supply port exceeds the lower of two pressures, the first of said two pressure being a pre-determined maximum allowable pressure at said supply port and the second of said two pressures being the pressure at the pilot control port of said pilot operated relief valve.

13. Hydraulic relief circuit means as defined in claim 12 including control valve means for selectively alternatively closing said pilot control port and subjecting said pilot control port to the pressure at the cylinder port of said pump.

14. Hydraulic relief circuit means as defined in claim 13 including control means for said control valve means which operates to close said pilot control port when said pump is operated to deliver fluid from said supply port to said cylinder port and to subject said pilot control port of the pressure at said cylinder port when said pump is operated to deliver fluid from said cylinder port to said supply port.

15. Hydraulic circuit means including:

(a) hydraulic pump means for delivering fluid from a supply port to a cylinder port, (b) a work cylinder, (c) first conduit means connecting said cylinder port and said work cylinder, (d) a fluid reservoir, (e) second conduit means connecting said cylinder port and said reservoir, (f) valve means controlling fluid flow through said second conduit means, said valve means comprising a pilot operated relief valve and a selector valve for selectively connecting the pilot port of said pilot operated relief valve with a plurality of outlets, and pressure controlling means connected to each of said outlets.

16. Hydraulic control means as defined in claim 15 wherein one of said outlets is closed and one of said outlets is connected to a relief valve.

17. Overload circuit means for a hydraulic system including pump means having a supply port and a cylinder port, first conduit means connecting said cylinder port with a work cylinder, second conduit means connecting said supply port with a supply control valve, and at least first and second fluid reservoirs connectable to said second conduit means through said supply control valve, said first reservoir containing fluid at a first pressure and said second reservoir containing fluid at a second pressure which is substantially greater than said first pressure, said overload circuit comprising:

(a) relief conduit means connecting said first conduit with said first reservoir, (b) a pilot operated relief valve controlling fluid flow through said relief conduit means and operable to permit fluid flow therethrough only when the pressure in said first conduit exceeds the lower of first and second control pressures, said first control pressure being the pressure appearing on the pilot port and said second pressure being a preset vent pressure, (c) control conduit means connecting the pilot port of said pilot operated relief valve with the inlet of a selector valve having one inlet and at least first and second outlets, (d) means for preventing fluid flow through said first outlet, (e) pressure relief valve means permitting fluid flow through said second outlet only when the pressure in said control conduit exceeds a pre-determined vent pressure which is lower than said preset vent pressure.

18. Overload circuit means as defined in claim 17 including means for actuating said selector valve to connect said control conduit with said first outlet when said second reservoir is connected to said supply port and to connect said control conduit with said second outlet when said first reservoir is connected to said supply port.

19. The method of controlling the flow of fluid between a fluid reservoir and a work cylinder through reversible pump means which selectively alternatively delivers fluid between a first port connected to said work cylinder and a second port connected to a first fluid reservoir comprising the steps of:

(a) permitting unrestricted fluid flow from said work cylinder to said first port but maintaining the pressure at said first port greater than the pressure at said second port when said pump means is operated to deliver fluid from said second port to said first port, and (b) permitting unrestricted fluid flow from said fluid reservoir to said second port but maintaining the pressure at said second port greater than the pressure at said first port when said pump means is operated to deliver fluid from said first port to said second port.

20. The method set forth in claim 19 wherein the flow of fluid from said first port to said work cylinder is controlled by a first pilot operated relief valve and the flow of fluid from said second port to said fluid reservoir is controlled by a second pilot operated valve, the method including the steps of:

(a) controlling the operation of said first pilot operated relief valve with the pressure at said second port, and (b) controlling the operation of said second pilot operated relief valve with the pressure at said first port.

21. The method set forth in claim 19 including the step of selectively alternatively substituting a second fluid reservoir for said first fluid reservoir, said second fluid reservoir containing fluid at a higher pressure than said first fluid reservoir.

22. The method set forth in claim 21 including the steps of:

(a) sensing the fluid pressure in said work cylinder and generating a signal at a pre-determined pressure, and (b) substituting said second fluid reservoir for said first fluid reservoir at said pre-determined pressure.

23. The method of limiting the pressure on the supply port side of a reversible variable displacement pump adapted for selectively alternatively delivering fluid between a supply port and cylinder port comprising the steps of:

(a) connecting conduit means between said supply port and a fluid reservoir, and (b) controlling fluid flow through said conduit means with valve means adapted to permit fluid flow from said supply port to said reservoir through said conduit means only when the pressure at said supply port exceeds the lower of two pre-determined pressures.

24. The method set forth in claim 23 wherein said valve means comprises a pilot operated relief valve which opens to permit fluid flow therethrough only when the pressure at said supply port exceeds the lower of two pressures, the first of said two pressures being a pre-determined maximum allowable pressure at said supply port and the second of said two pressures being the pressure at the pilot control port of said pilot operated relief valve.

25. The method set forth in claim 24 including the step of selectively alternatively closing said pilot control port and subjecting said pilot control port to the pressure at the cylinder port of said pump.

26. The method set forth in claim 25 including the steps of:

(a) closing said pilot control port when said pump is operated to deliver fluid from said supply port to said cylinder port, and (b) subjecting said pilot control port to the pressure at said cylinder port when said pump is operated to deliver fluid from said cylinder port to said supply port.

27. The method of limiting fluid pressure between pump means and a work cylinder in a hydraulic system including pump means having a supply port and a cylinder port, first conduit means connecting said cylinder port with a work cylinder, second conduit means connecting said supply port with a supply control valve, and at least first and second fluid reservoirs connectable to said second conduit means through said supply control valve, said first reservoir containing fluid at a first pressure and said second reservoir containing fluid at a second pressure which is substantially greater than said first pressure, comprising the steps of:

(a) connecting relief conduit means between said first conduit and said first reservoir, (b) controlling fluid flow through said relief conduit means with a pilot operated relief valve to permit fluid flow therethrough only when the pressure in said first conduit exceeds the lower of first and second control pressures, said first control pressure being the pressure appearing on the pilot port of said pilot operated relief valve and said second pressure being a preset vent pressure, and (c) connecting the pilot port of said pilot operated relief valve with the inlet of a selector valve having one inlet and at least first and second outlets.

28. The method set forth in claim 27 including the step of actuating said selector valve to connect said control conduit with said first outlet when said second reservoir is connected to said supply port and to connect said control conduit with said second outlet when said first reservoir is connected to said supply port.

* * * * *